Nov. 26, 1957    W. F. McILHENNY ET AL    2,814,399
ROTARY SCOOP FEEDER
Filed Sept. 28, 1955
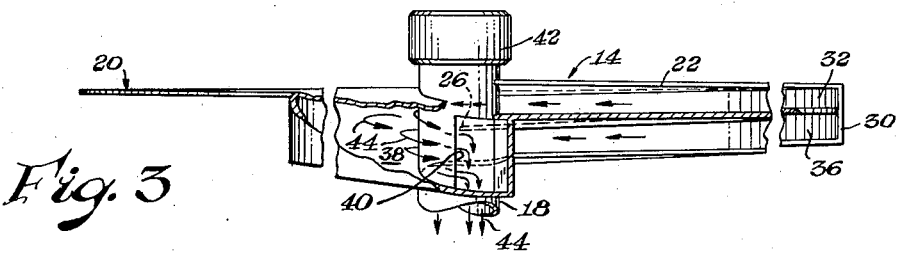
Fig. 3
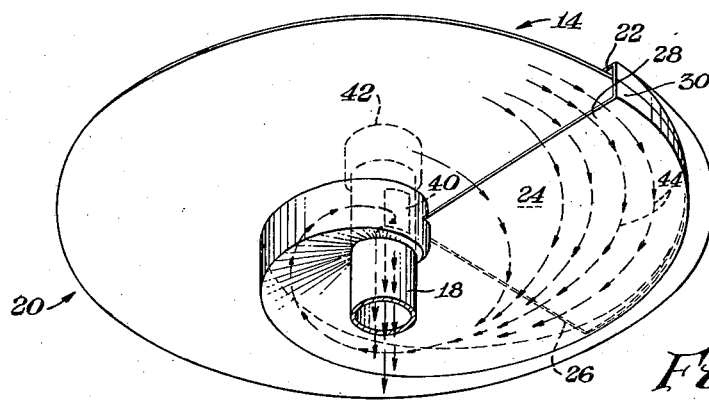
Fig. 2
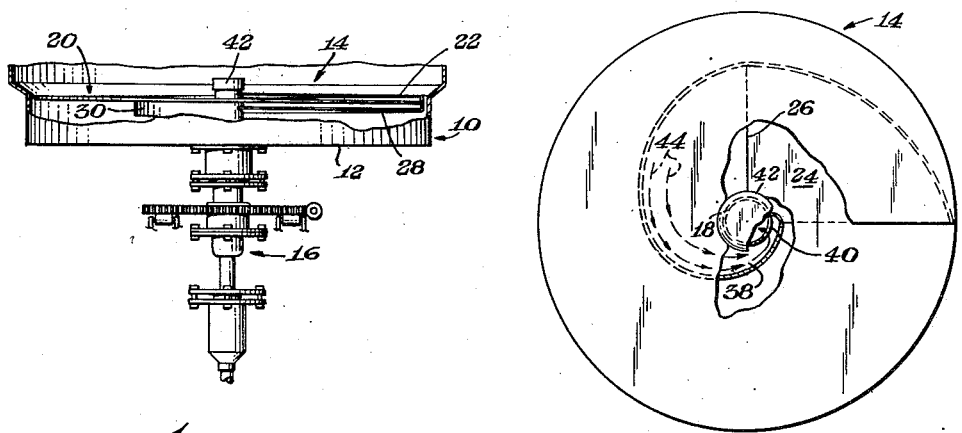
Fig. 1
Fig. 4
INVENTORS
William F. McIllhenny
Albert B. Baker
James A. Clarke
BY *Griswold & Burdick*
ATTORNEYS

United States Patent Office 2,814,399
Patented Nov. 26, 1957

2,814,399

ROTARY SCOOP FEEDER

William F. McIlhenny and Albert B. Baker, Freeport, and James A. Clarke, Lake Jackson, Tex., assignors to The Dow Chemical Company, Midland, Mich., a corporation of Delaware Application September 28, 1955, Serial No. 537,234

7 Claims. (Cl. 214—17)

This invention relates to mechanisms for continuously withdrawing the inventory from the lower part of a flat bottomed tank, and particularly to a rotary scoop feeder for removing granular solids in liquid media from the bottom of an ion exchange column.

A conventional way of removing granular solids from a moving bed of materials is to withdraw the materials from a cone bottomed tank in which the moving bed is contained. However, most of the material contained in the cone bottom is dead inventory so far as moving bed operation is concerned and as such is uneconomical when large columns are used. Further, material is not withdrawn uniformly over the cross sectional area of the moving bed, resulting in a somewhat uneven rate of movement of materials in different areas of the cross-section of the bed.

Accordingly, a principal object of this invention is to provide an improved, more economical means for continuously withdrawing granular solids in liquid media from the bottom of a flat bottomed tank.

Another object of this invention is to provide improved apparatus for continuously withdrawing granular solids in liquid media from the bottom of a flat bottomed tank containing a downwardly moving ion exchange bed while maintaining similar relative movement throughout the bed.

In accordance with this invention there is provided at the bottom of a round, flat bottomed tank a rotary scoop feeder whose upper part is shaped generally as the flight of a screw having at least one turn, the screw fitting closely within the tank and having a pitch which is small with respect to the diameter of the screw. The lower part of the scoop includes a spiral passageway which communicates both with the "biting" upper section of the scoop feeder and an axially disposed hollow shaft or root of the screw. As the scoop feeder rotates the leading edge of the screw "bites off" a layer of solids from the bottom of the moving resin bed in the tank, the solids then being passed through the spiral passageway and removed through the centrally disposed hollow shaft of the scoop feeder.

The invention, as well as additional objects and advantages thereof, will best be understood when the following detailed description is read in connection with the accompanying drawings, in which:

Fig. 1 is a side elevational view, partly broken away and in section, of a rotary scoop feeder, in accordance with the invention, which is installed at the lower end of a flat bottomed tank and showing the support and drive means for the scoop;

Fig. 2 is an isometric view of the lower part of the scoop shown in Fig. 1;

Fig. 3 is a side elevational view, on an enlarged scale and partly broken away and in section, of a rotary scoop of the type shown in Fig. 1, and Fig. 4 is a plan view, partly broken away and in section, of the scoop shown in Fig. 1, showing the path followed by material entering the scoop.

Referring to Fig. 1, there is shown a flat bottomed tank, indicated generally by the numeral 10, having disposed near the bottom 12 thereof a rotary scoop feeder, indicated generally by the numeral 14. The scoop feeder 14 is supported and driven by a drive unit, indicated generally by the numeral 16, which is disposed below the tank 10.

The drive unit is described and claimed in copending application, Serial No. 537,144, filed September 28, 1955, by Zollie B. Capps, entitled "Packing Gland and Drive Unit," now U. S. Patent 2,756,764.

Referring to Figs. 2, 3, and 4, as well as to Fig. 1, the rotary scoop feeder 14 includes a hollow shaft 18 which is axially and concentrically disposed with respect to the tank 10. A screw plate, indicated generally by the numeral 20, whose diameter is such that it fits closely within the tank 10, is spiraled around the shaft 18 and secured thereto, forming a screw having a flight of about 1¼ turns. Because the pitch of the screw plate 20 is small with respect to the diameter of the plate 20, the leading or biting edge 22 of the plate 20 forming the screw is disposed only slightly above the adjacent segment 24 of the next "turn" of the screw flight.

The segment 24 of the plate 20 extends partially around the shaft 18 and terminates at the edge 26 to form the partial or second "turn" of the screw flight. The outer peripheral edge of the fractional second turn of the screw spirals inwardly towards the central shaft 18.

Beneath the segment 24 is a separate throated member 28 whose outer periphery is aligned with the periphery of the segment 24. A sheet 30 extends from the outer peripheral edges of the segment 24 and the spiral member 28 to the lower surface of that part of the plate 20 which is above the spiraled parts (segment 24 and member 28) of the feeder 14.

The sheet 30, wall of the shaft 18, the segment 24, and the leading edge 22 of the plate 20 define a scoop inlet 32, hereafter referred to as the upper scoop 32, on the upper surface of the plate 20. Similarly, the sheet 30, spiraled member 28, the wall of the shaft 18, and the leading edge form a similarly directionally disposed scoop, the lower scoop 36 below the lower surface of the plate 20.

The upper and lower scoops, 32, 36, as may be seen from the drawings, taper inwardly to form a joint passageway 38 beyond the trailing edge 26 of the second turn (segment 24) of the plate 20.

The wall of the shaft 18 which forms the inner peripheral border of the passageway contains an orifice 40 which opens into the spiral passageway 38 which communicates both with the upper scoop 32 and the lower scoop 36. The upper end of the shaft 18 extends above the plate 20 and is closed by an end cap 42. The lower end of the hollow shaft 18 is connected to the drive unit 14 through which materials are withdrawn from the shaft 18.

One general type of apparatus in which the rotary scoop feeder of this invention may be used to advantage is illustrated in U. S. Patent No. 2,671,714, entitled "Continuous Method for Concentrating Ions in Solution," issued March 9, 1954, to W. F. McIlhenny and V. O. McConnell. In Patent No. 2,671,714 the ion exchange column is contained in a tank having a conical bottom structure rather than the flat bottomed ion exchange tank 10 described herein. The method of the patent is applicable, however, to use with the apparatus of this invention.

In operation, the rotary scoop feeder is usually rotated at a rate between ½ and 2 revolutions per minute. The height of the opening in the upper scoop 32, which controls the "bite" of solid materials drawn into the scoop from the ion exchange column, for example, is greater at the outer periphery (near the sheet 30) of the scoop 32 than is the corresponding height near the shaft 18. While the increase in the "bite" at the outer peripheral edge of the scoop 32 is in part due to the symmetry of the flight of the screw plate 20, the increase in bite has been found to be necessary because the solids nearer the center of the column tend to move downwardly more readily and would otherwise be drawn into the scoop 32 to a greater extent than would the solids nearer the outer wall of the tank 10. Another reason for the upper scoop 32 having a larger bite near the outer periphery of the scoop is that material entering the scoop near the edge close to the shaft 18 has a shorter path to travel before the material enters the hollow shaft 18 through the orifice 40.

The lower or second scoop 36 serves to pick up material which passes around the outer peripheral edge of the screw plate 20, and therefore the throat opening of the second scoop 36 need not be tapered or otherwise especially dimensioned if the throat opening therein be large enough to pass the volume of material present below the plate 20.

The scoops 32, 36 and the spiral passageway 38 into which both the upper and lower scoops 32, 36 feed are shaped, when viewed in plan, generally as an Archimedean spiral. Since the passageway 38 decreases in width as it approaches the shaft 18, the height of the passageway 38 is increased to maintain at least the cross sectional area at least as large as exists in the outer or throat part of the scoops 32, 36.

The direction of flow of materials through the rotary scoop feeder 14 is indicated by the arrows 44 in Figs. 2, 3, and 4.

A particular rotary scoop feeder made in accordance with this invention and which operates successfully is 5 feet in diameter, the plate 20 being made of 10 gauge Monel metal plating, and the shaft 18 is made of heavy duty Monel pipe having a diameter of 4 inches. Other metals may be used in the construction of the rotary scoop feeder, the particular metals chosen depending on the load bearing on the feeder and the corrosion problems involved. The maximum throat opening above the plate 20 for the upper scoop 30 is ¾ inch, or about $\frac{1}{80}$ of the flight diameter. The throat opening of the lower throat 32 is ½ inch. The scoop feeder 14 was rotated to provide a downward velocity of the moving column in the tank 10 of .02 to .04 foot per minute.

Some stiffener strips were provided along the throat of each scoop 32, 36 to maintain the proper separation between the leading edge 22, for example and the surface of the plate 20 which lies below it.

We claim:

1. A rotatable feeder for removing particulated solids in liquid media from the lower part of a container comprising a screw adapted to fit into the container through the bottom thereof, said screw including a vertically disposed hollow root shaft and three screw flights spaced along said shaft, the first of said flights having a constant radius and being the uppermost flight of said screw, the second of said flights having a diminishing radius, the second flight being a continuation of the first flight of said screw, the third of said flights being spaced along said shaft discontinuously with respect to the second flight but being radially aligned with said first and second flights, the radius of said third flight diminishing to said root shaft at the end of one flight, sheet means connecting the radial periphery of said third flight to the corresponding peripheral edge of the second flight and to the adjacent surface of the first flight of the screw, thereby forming a throated passageway between said first and second flights and a throated passageway between said second and third flights, each of said passageways extending to said hollow root shaft, and orifice means in said shaft communicating with said passageways.

2. A rotatable feeder for removing particulated solids in liquid media from the lower part of a container comprising a screw adapted to fit into the container through the bottom thereof, said screw including a vertically disposed hollow root shaft and three screw flights spaced along said shaft, the first of said flights having a constant radius and being the uppermost flight of said screw, the second of said flights having a diminishing radius, the second flight being a continutaion of the first flight of said screw and comprising less than a complete turn of the screw, the third of said flights being spaced along said shaft discontinuously with respect to the second flight but being radially aligned with said first and second flights, the radius of said third flight diminishing to said root shaft at the end of one flight, sheet means connecting the radial periphery of said third flight to the corresponding peripheral edge of the second flight and to the adjacent surface of the first flight of the screw, thereby forming a throated passageway between said first and second flights and a throated passageway between said second and third flights, each of said passageways extending to said hollow root shaft, and an orifice in said shaft communicating with said passageways.

3. A rotatable feeder in accordance with claim 2, wherein the pitch of said first flight is approximately $\frac{1}{80}$ of the diameter of the flight and the diameter of the shaft is about $\frac{1}{15}$ of the diameter of the first flight.

4. A rotatable feeder in accordance with claim 2, wherein the radial periphery of said third flight is shaped generally as an Archimedean spiral.

5. A rotatable feeder in accordance with claim 2, wherein said flights are made of metal sheet material.

6. A rotatable feeder in accordance with claim 2, wherein said root shaft extends through the bottom of said container.

7. A rotatable feeder in accordance with claim 2, wherein said root shaft extending above said first flight is closed by an end cap.

No references cited.